Patented Oct. 20, 1953

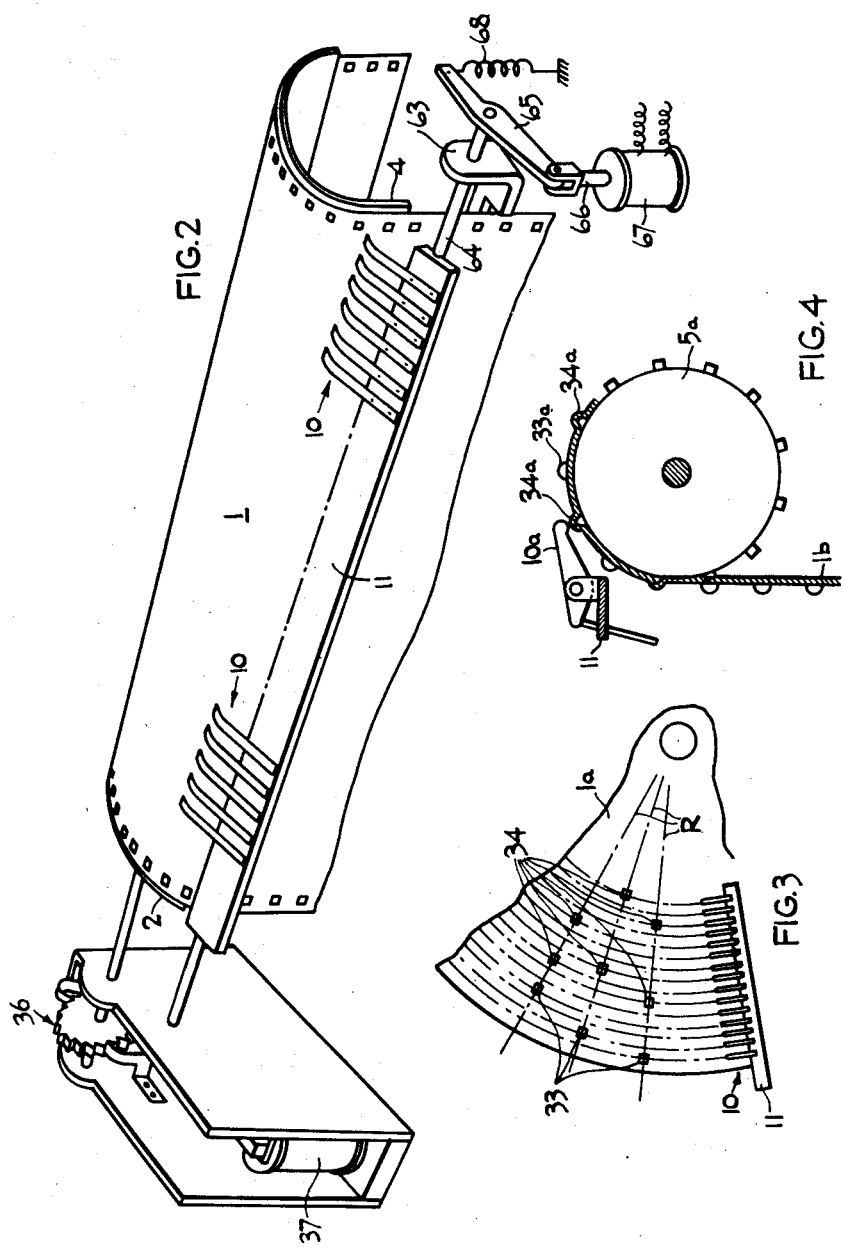

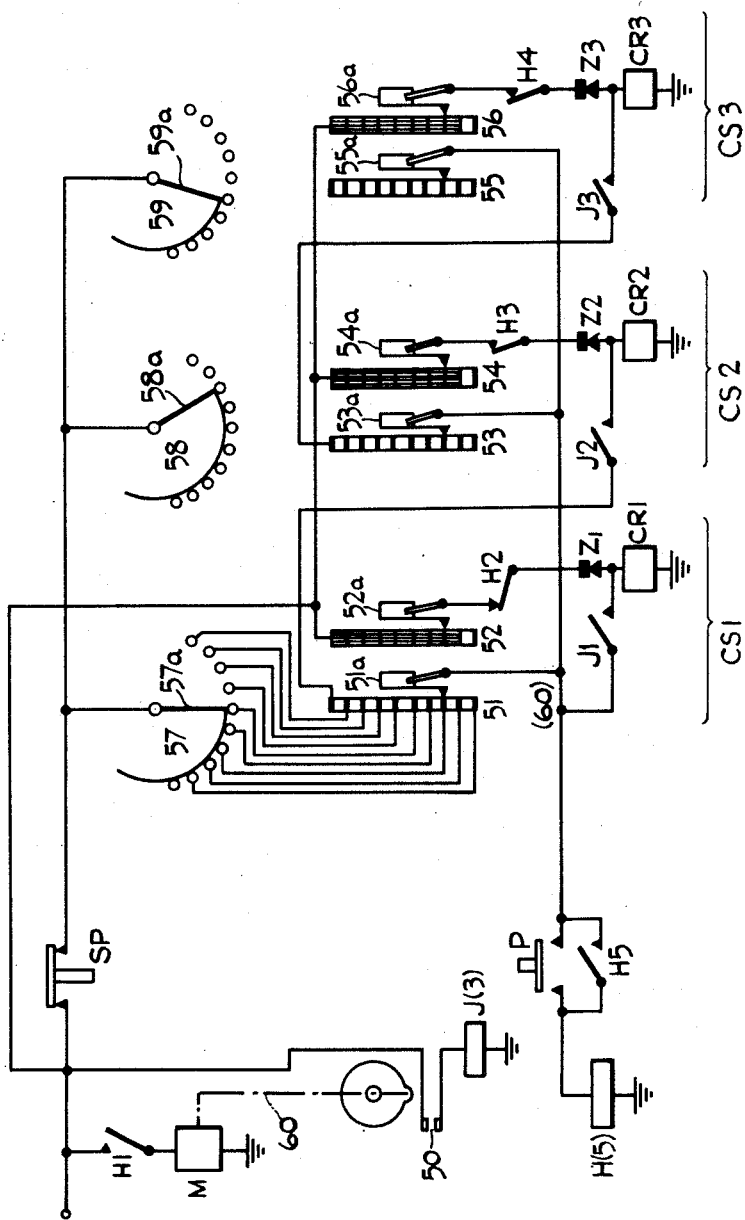

2,656,109

UNITED STATES PATENT OFFICE 2,656,109

AUTOMATIC OPERATION CONTROLLER HAVING PREDETERMINING MEANS

Herman Lindars, Sheffield, England

Application December 15, 1949, Serial No. 133,203
In Great Britain December 17, 1948

9 Claims. (Cl. 235—132)

This invention concerns automatic operation or event controllers in which a predetermined programme of successive events and their respective durations is first set up on a suitable device, and the subsequent initiation of the first event, its termination after the desired period, and the initiation and termination of the successive events are automatically controlled. In this specification, the term "programme" is regarded as including the case where only one event is concerned but this event is required to take place repeatedly, and the durations of successive occurrences may be required to be different.

The programme may be automatically repetitive or not as desired. The events may be of similar or different natures, e. g. mechanical operations such as the movement of a member or the injection or discharge of a given volume of fluid, or phases of physical or chemical treatment such as heating or digesting stages in a process, or the like. As examples of practical applications of the invention may be cited the control of a number of sequential steps in the manufacture of an article such, for example, as the manufacture of soap or paint, or the processing of commodities, such as laundering processes or chemical or like treatments, such as water softening or metallurgical heat treatment processes.

In certain known forms of automatic event controllers, a number of sequential events are represented by markings in the form of apertures in a perforated chart which is constituted by a flexible band or strip of insulating material, and which is moved at constant speed over a conducting surface beneath a number of exploring contact fingers, each of which is connected in circuit with an electrical relay or like device for effecting the operation of a corresponding event, the said device being energised when an aperture in the chart is presented to the respective exploring contact finger to permit the said finger to make electrical contact with the underlying conducting surface. The period of duration of the selected event is then determined—for the known value of constant speed of the chart—by the length of the corresponding aperture measured in the direction of motion of the chart.

Such known apparatus normally suffers from two disadvantages. In the first place, in order to reduce the overall size of the perforated chart where a large number of events is involved, or where the successive events have long durations, it is necessary to reduce the speed of the chart so that the lengths of the apertures can be kept to a practical minimum. This, however, involves a correspondingly high degree of accuracy in the initial formation of the apertures, and the selection of a material for the chart which is, for all practical purposes, inextensible under varying ambient conditions of, say, temperature or humidity. In addition, the wear on a continuously moving chart at the point where it is engaged by the exploring contact fingers is relatively high, particularly at the beginning and end of an aperture so that the accuracy of length of an aperture can soon be seriously impaired and lead to undue prolongation of the corresponding event. Thus, such charts normally have to be frequently changed, which involves the manufacture of a number of charts for the same programme to within close limits of accuracy. The apparatus thus tends to be relatively expensive to maintain.

It is an object of the present invention to overcome these disadvantages, and to provide automatic event control apparatus in which the accuracy of duration of an event is largely independent of the tolerances of manufacture of the controller. Another object is to provide automatic event control apparatus in which the danger of undesired overlapping of events, due to wear of the programme setting device, is substantially reduced or eliminated.

Throughout this specification the term "duration" is used to denote any period which is measured either by reference to a clock mechanism or to apparatus which counts discrete occurrences, such as the passage of successive unit quantities of a substance. The latter may be units of volume of flow of a fluid, whether continuous or intermittent, or numbers of articles passing along a given path.

According to the present invention automatic mechanism for controlling an event comprises means for generating impulses to represent duration of the event in any desired scale of units, means for preselecting the number of impulses in a train to represent a desired duration of the event, and means for terminating the event when the predetermined number of impulses has been counted.

The means for preselecting the number of impulses in a train representing a desired duration of the event may comprise a multicontact selecting switch having a number of fixed contacts to be successively engaged by a moving contact which is advanced stepwise from one contact to the next by a step-by-step mechanism energised intermittently in accordance with the passage of units of time or flow as the case may be. An example of such a step-by-step selector switch is the device generally known as a "uniselector" switch commonly used in automatic telephone and like circuits.

Alternatively, the said preselecting means may comprise a chart having markings thereon at positions representing the desired duration of the said event and exploring means to co-operate with the said markings to define the instant of termination of the event.

In order that the invention may be more clearly understood, various embodiments thereof will now be described by way of example only with reference to the accompanying drawings in which:

Fig. 2 is a view similar to Fig. 1 of a modified construction;

Fig. 3 is a fragmentary view of an alternative form of chart;

Fig. 4 is a transverse sectional elevation of a further alternative form of chart;

Figs. 6 and 7 are circuit diagrams of alternative constructions of controller.

Throughout the drawings, like parts carry similar reference numerals.

Figure 1:
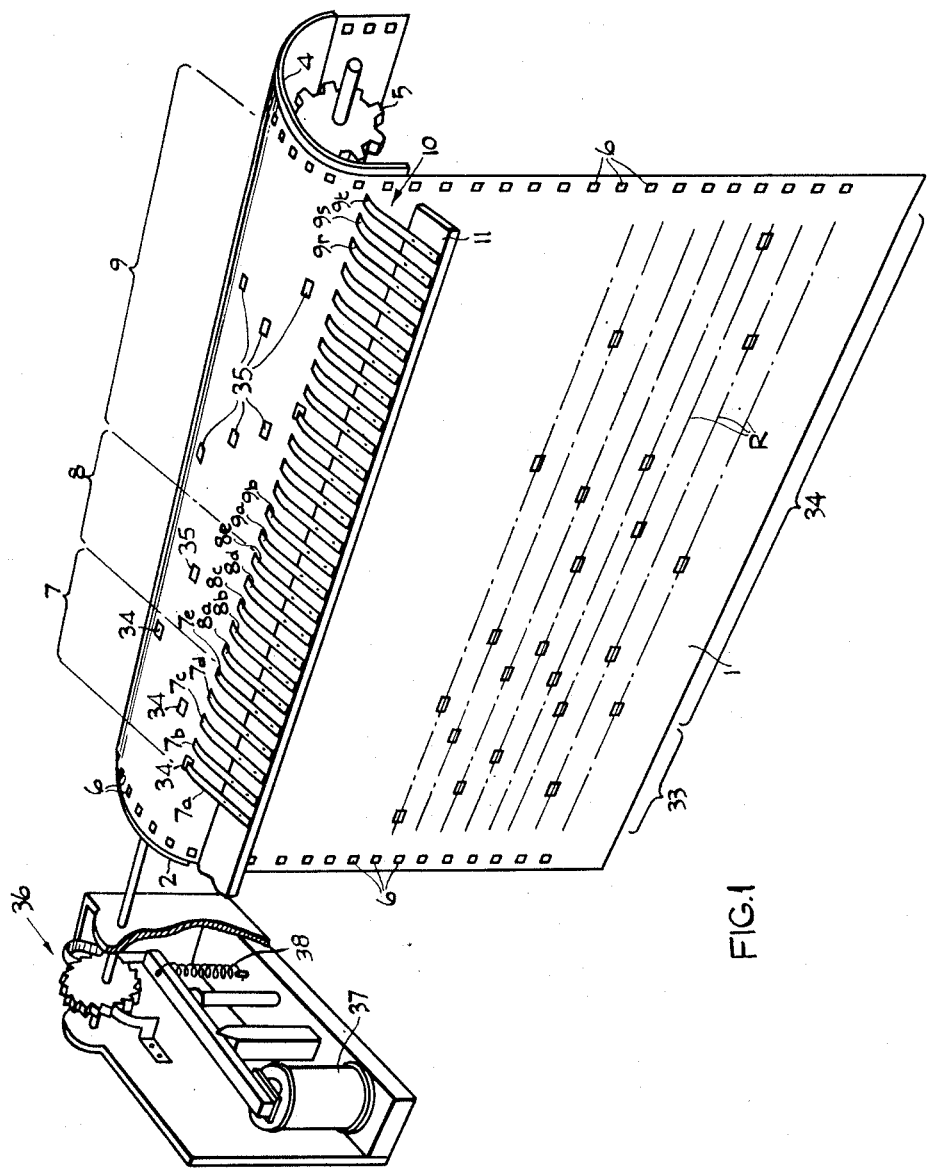
Fig. 1 is a perspective view of an arrangement of perforated chart.
Figure 5:
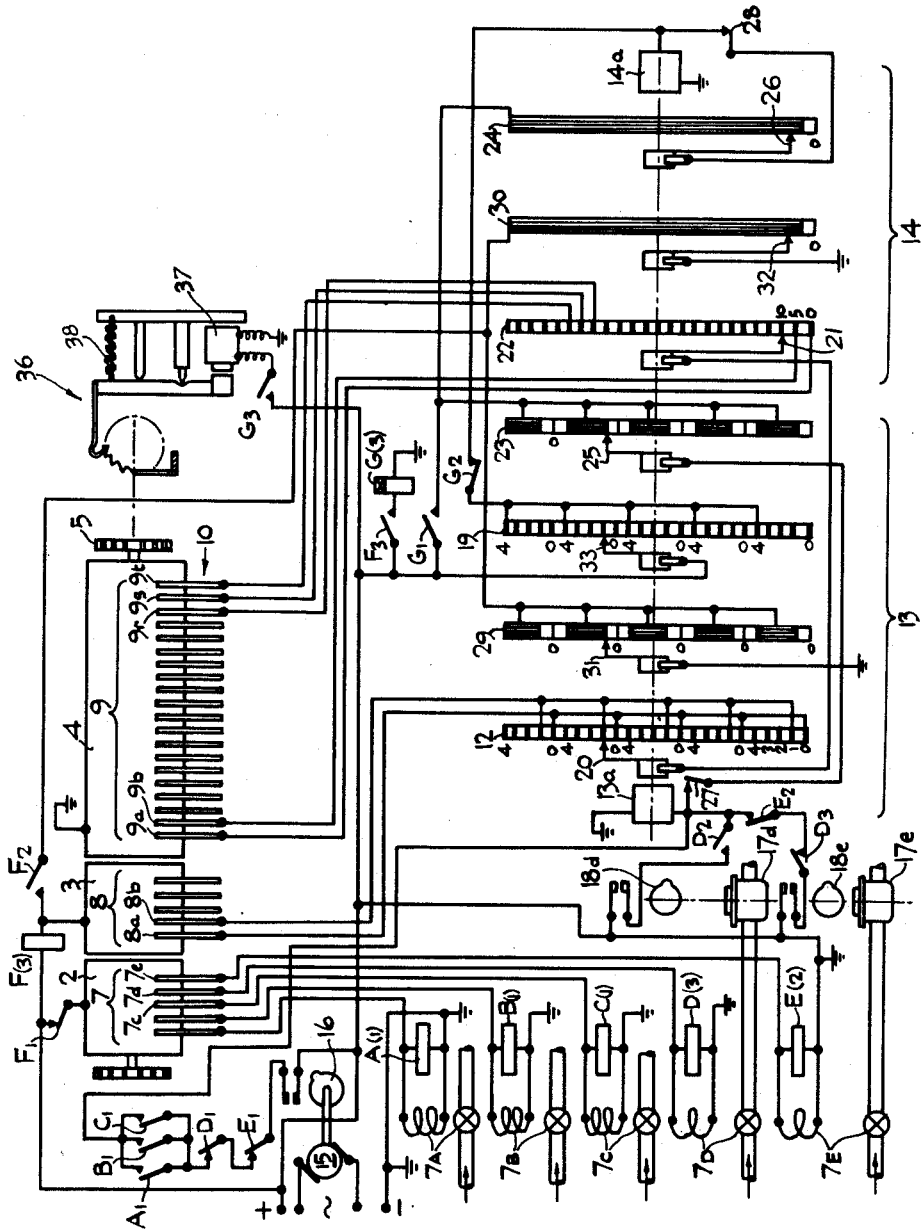
Fig. 5 is a circuit diagram of a controller using a chart as shown in Fig. 1 or 2.

Referring first to Figs. 1 and 5, the desired programme of events and their durations is marked on a chart 1 (omitted from Fig. 5 for clarity of illustration of the electrical circuit) which is in the form of a strip of flexible but inextensible insulating material. The chart is passed over an electrically conducting surface divided into three sections 2, 3, 4, and is driven by means of a pair of sprockets 5 which engage driving holes 6 along the edges of the chart. The first section 2 of electrical conducting surface over which the chart 1 is passed is co-extensive with a first group 7 of fixed resilient contact fingers 10 which are mounted on a common carrier bar 11 so as to bear resiliently against the surfaces of the chart 1. The fingers $7a \ldots 7e$ of this first group 7 represent the different operations or events to be controlled, each finger representing a respective event and being connected to an electrical device $7A \ldots 7E$ for performing the desired operation. This device may, for example, comprise a solenoid for operating a valve (as in the embodiment illustrated) or a switch for controlling a motor.

The remaining fingers 10 are divided into two groups 8, 9, the first representing the units from 0 to 4 inclusive whilst the others represent the 5's and 10's from 0 to 95 inclusive. These two groups 8, 9 constitute a second series of fingers which control the duration of an event. Each finger $8a \ldots 8e$ in the units group 8 is connected to contacts correspondingly numbered 0 to 4 respectively in the units contact bank 12 of a units rotary selector switch 13 of the kind commonly used in automatic telephone circuits, whilst each finger of the 5's and 10's groups 8, 9 respectively is connected to a corresponding channel in a 10's rotary selector switch 14 of similar design. It will be understood that these rotary selector switches 13, 14 are represented in Fig. 5 in the conventional manner by a developed diagram.

A synchronous motor 15 drives a timing or "clock" electrical pulse generator 16, whilst each of the controlled devices 7D, 7E which, in the example shown, is adapted to supply, say, a measured volume of a fluid or a given number of articles incorporates a respective quantity meter $17d$, $17e$ to which is connected a corresponding electrical impulse generator $18d$, $18e$, each impulse representing a unit of volume or a predetermined number of articles. With each event performing device $7A \ldots 7E$ is associated a corresponding relay $A(1)$, $B(1)$, $C(1)$, $D(3)$, $E(2)$ respectively which is connected across the electrical circuit to the device so as to be energised simultaneously therewith. Each of these relays operates a set of contacts referenced respectively $A_1$; $B_1$; $C_1$; $D_1$, $D_2$, $D_3$; and $E_1$, $E_2$. The contacts $A_1$, $B_1$, $C_1$, $D_2$ and $E_2$ are normally open whilst the contacts $D_1$, $D_3$ and $E_1$ are normally closed, these states being reversed on energisation of the appropriate relays. The contacts $D_1$ and $E_1$ are connected in series between the output from the time impulse generator 16 and the contacts $A_1$, $B_1$ and $C_1$ connected in parallel with each other. The circuit is completed to earth through the operating coil $13a$ of the selector switch 13.

The clock generator 16 is thus connected in circuit with the operating coil $13a$ of the selector switch 13 on each occasion when the event performed by one of the devices 7A, 7B, 7C is initiated by the chart 1. When the chart selects the event performed by the device 7D, however, the relay $D(3)$ is energised to open the contacts $D_1$ and $D_3$ and to close the contacts $D_2$. The latter place the flowmeter pulse generator $18d$ in circuit with the operating coil $13a$ of the selector switch 13 so that the latter is stepped round at a rate corresponding to the rate of flow of fluid or articles through the meter $17d$. At the same time, the opening of the contacts $D_3$ opens the circuit from the flowmeter pulse generator $18e$ to the operating coil $13a$ of the selector switch 13. Similarly, if the chart 1 selects the event performed by the device 7e, the contacts $E_1$ are opened and the contacts $E_2$ are closed so that the circuit from the generator $18e$ is completed through the normally closed contacts $D_3$ to the operating coil $13a$, and the selector switch 13 is stepped round at a rate dependent on the rate of flow of articles or fluid through the meter $17e$.

Thus it will be seen that the relays $A(1)$, $B(1)$, $C(1)$, $D(3)$ and $E(2)$ are operative to energise the relay $13a$ of the selector switch 13 in accordance with the units in which the duration of the associated event is measured—i. e. in the case of the events performed by the devices 7A, 7B, 7C, the duration is measured in units of time, whilst in the case of the devices 7D, 7E, the duration is measured in terms of units of flow. Furthermore, the relay contacts are interlocked to ensure that in no circumstances is the clock generator 16 connected in circuit with the coil $13a$ when an event performed by one of the devices 7D, 7E is selected by the chart 1, and vice versa.

The selector switch 13 has a second bank of contacts 19, every fifth contact (marked "4" in Fig. 5) being paralleled and connected, through relay contacts $G_2$ referred to below, to the operating coil $14a$ of the 10's rotary selector switch 14. A wiper 20 engages the bank 12 in the selector switch 13 and is connected in series with a wiper 21 which engages a contact bank 22 in the 10's selector switch 14, the contacts of which are connected, in order, to respective fingers $9a$, $9b \ldots 9r$, $9t$ (only the first two and last three circuits are shown in full in Fig. 5 to avoid confusion of the diagram).

Each selector switch 13, 14 also has a "homing" bank of contacts 23, 24 respectively, the co-operating wipers 25, 26 being connected in series with respective self-drive contacts 27, 28 and the corresponding operating coils 13a, 14a. These self-drive contacts are arranged, in relation to the magnetic core of the associated operating coil, in the manner of trembler contacts so that, when energised at the appropriate moment (as described below), they cause the respective coils 13a, 14a to drive all the wipers in their selectors until the homing wiper 25 or 26, as the case may be, reaches an open or zero contact in the corresponding homing bank. The remaining contacts in each homing bank are strapped together and connected to the positive main through relay contacts $G_1$ (see below). The zero contacts (marked "0" in Fig. 5) are located at every fifth place on the bank 23, but only in the first place on the bank 24. The selector switch 13 is thus "homed" on to any one of the zero contacts on the bank 12, whilst the selector switch 14 is "homed" only on to the zero contact on the bank 22.

A further bank 29, 30 of hold-in contacts in each selector 13, 14, respectively, is arranged similarly to the "homing" contact bank 23 or 24 in that selector, and both banks are connected in series with a relay F(3) through hold-on contacts $F_2$. The other side of the relay is connected to the positive main. It will thus be seen that, once energised, the relay F(3) will be held in so long as either of the hold-in wipers 31, 32 is hunting for a zero contact on the respective bank 29, 30.

The relay F(3) is connected in series between the positive main and the "units" section 3 of the conducting surface over which the chart I is advanced, and controls a pair of normally closed contacts $F_1$ which serve to connect the positive main to the "events" section 2 of the said surface with which the events fingers 7 engage. The circuit of the relay F(3) is completed to earth through the conducting section 3, one of the fingers in the group 8 (selected by one of a pair of apertures 35 in the chart I), a corresponding channel on the contact bank 12 of the units selector switch 13, the wiper 20, the wiper 21 of the 10's selector switch 14, the channel on the contact bank 22 corresponding to the finger 9a . . . 9t of the group 9 which is selected by the other of the pair of apertures 35 in the chart I, the said selected finger 9a . . . 9t, and the conducting section 4, which is earthed. When this series circuit is completed, the relay F(3) operates to open the contacts $F_1$ and thus to disconnect the positive main from the device 7A . . . 7E corresponding to the finger 7a . . . 7e selected by an aperture 34 in the chart I. Simultaneously the relay A(1) is released and the contacts $A_1$ are opened to de-energise the operating coil 13a of the units selector switch 13.

The time which elapses between the energisation of one of the devices 7A . . . 7E and the operation of the relay F(3) depends upon the time required for the wipers 20 and 21 to make their several excursions along the contact banks 12, 22 respectively. The wiper 21 is stepped round by the operating coil 14a which receives its pulses from the "carry-over" bank of contacts 19 on the units selector 13 and the coacting wiper 33. A carry-over pulse is transmitted to the coil 14a on each occasion when the wiper 33 passes over a fifth contact—marked 4 in the drawings. The speed of operation of the selector 14 is thus one fifth that of the selector 13, and since the speed of operation of the selector switches 13, 14 is either constant (in the case of a time controlled event) or directly proportional to flow through the device 7D, 7E (in the case of an event whose duration is determined in terms of units of flow), it will be seen that the circuit from the conducting section 3 to the conducting section 4 constitutes an adjustable time switch for determining the duration of the selected event.

It will further be understood that, in the example illustrated, where the duration of the event does not reach the minimum value in the range envisaged by the "tens" group of fingers 9, the lowest or "zero" finger 9a of the group must make contact with the conducting surface 4 through an aperture 35 in the chart I, this ensuring continuity of the series circuit through the zero contact on the bank 22 of the tens selector switch 14. Similarly, where the duration is an integral multiple of the minimum value represented by the group of fingers 9, the lowest or zero finger 8a of the units group 8 must make contact with the conducting section 3, the series circuit being completed through one of the zero contacts on the bank 12 of the units selector switch 13. The chart I thus consists (Fig. 1) of rows R of apertures 34, 35, there being one "event" aperture 34 to co-operate with one of the five "event" fingers 7a . . . 7e and two duration apertures 35, one to co-operate with a finger of each of the groups 8, 9. These apertures 34, 35 are not required to be formed to any close tolerances, but they are grouped in straight rows R across the chart. Each aperture 34 is operative, therefore, to select the particular event which it is required should take place. In the same row, the two apertures 35 are operative to determine the duration of the event represented by the first aperture 34 in the row.

The chart I is advanced by means of an electromagnetically driven pawl and ratchet mechanism 36, the operating coil 37 of which is controlled by relay contacts $G_3$ which are closed when the desired period of duration of a given event, as determined by the chart I, has elapsed.

When the relay F(3) has operated to open the contacts $F_1$ and terminate the event, the contacts $F_2$, $F_3$ are closed simultaneously with the release of the relay $A_1$. The closing of contacts $F_2$, as has already been described, connects the positive main through the relay F(3) to the commoned contacts on both banks 29, 30 in the selector switches 13, 14 respectively, and thence through the wipers 31, 32 to earth. The relay F(3) is thus held in.

The closing of contacts $F_3$ energises a slugged relay G(3) which operates contacts $G_1$, $G_2$ and $G_3$. Contacts $G_1$ close to connect the positive main to the banks 23, 24 and thence through wipers 25, 26 to the respective self-drive contacts 27, 28 of the selector switches 13, 14. Each operating coil 13a, 14a then "homes," or returns all its wipers to a zero position, and automatically becomes de-energised. Simultaneously, contacts $G_2$ are opened so that no "carry-over" pulses are fed to the operating coil 24a from the "carry-over" bank 19 of the units selector switch 13 (via the wiper 33) should the latter have to pass over a "4" contact during the automatic self-drive period. The contacts $G_3$ are closed to energise the coil 37 which locates the pawl of the pawl and ratchet mechanism 36 in engagement with the next tooth of the ratchet wheel, but holds it so long as the coil 37 is energised. Stepwise advance of the chart 1 cannot, therefore, immediately take place, but occurs, under the action of a spring 38, when the coil 37 is de-energised. The relay G(3) remains energised so long as the contacts F₃ are closed—i. e. until the selector switches have "homed." When these contacts are opened, the relay G(3) releases the contacts G₁, G₃ and restores the contacts G₂, the circuit being then in a state of readiness to act upon the next instruction from the chart 1. Release of the relay contacts G₁, G₂, G₃ is delayed slightly by the presence of the slug on the relay G(3). This ensures that everything is in readiness before the chart 1 is advanced.

It is preferred to arrange (see Fig. 2) that the common carrier bar 11 on which the fingers 10 are mounted can be rotated through a small angle to raise the fingers clear of the chart 1 immediately prior to its advancing movement so that no frictional wear takes place between the fingers and the chart. For this purpose, the carrier bar 11 is pivotally supported at its ends in frame members such as the frame of the pawl and ratchet mechanism 36 and a bracket 63. The spindle 64 which is carried in the bracket 63 has secured to the free end thereof an arm 65 which is pinned at its one end to the plunger 66 of a solenoid 67, and at its other end is engaged by a coiled tension spring 68 which serves to bias the fingers 10 into contact with the chart. The solenoid 67 may be connected in parallel with the coil 37 of the chart advancing mechanism 36, or may be separately controlled through individual relay contacts.

In an alternative arrangement, a series of cams or a lift bar may be provided for positively lifting the fingers 10 out of contact with the chart.

In the arrangement shown in Fig. 3, the chart is in the form of a disc 1a, the exploring fingers 10 being located on a radius of the disc.

The exploring devices may be in the form of photo-electric cells to be illuminated by light passed through the holes in the chart. Alternatively, the chart may be of a magnetic material, the markings being constituted by magnetic poles and the exploring devices by electromagnetic pick-ups.

Where the exploring elements are of a mechanical nature or are mechanically operated, the chart may be of a hard material and provided with markings in the form of projections or depressions for effecting the necessary displacements of the exploring elements. Such a chart 1b is shown in Fig. 4 in which the event markings 34a and the duration markings 35a are in the form of embossed projections which are engaged by rockers 10a.

In an arrangement such as that described above, it will be evident that any programme within the capacity of the controller can be operated by the provision of the appropriate chart, thus imparting a high degree of flexibility to the controller.

An alternative construction of programme controller according to the present invention is particularly suitable in cases where the programme for a given process is largely fixed and the sequence of events is not variable, or are variable to only a limited extent. In this form, illustrated in Fig. 6, the events to be controlled are each represented by a contact or channel on one or both of the banks 39, 40 of contacts of a rotary preselector switch PS of the telephone type. This selector will be hereinafter referred to as the programme selector switch. The controller is initially designed for a given programme, and each device 7A . . . 7E is connected to one or more of the contacts in the banks 39, 40 according to the position in the programme sequence at which the event associated with the device is to occur. Thus, in the example shown, the winding of the device 7A is connected to the contacts numbered 1, 3, 6 and 8 on the bank 39, whilst the device 7B is connected to the contacts 2, 9 and 12. The devices 7C and 7D are similarly connected to other contacts on the bank 39. The device 7D is also connected to contact 5 on the bank 40, whilst the device 7E is connected to contact 11 on the bank 40. Each device 7A . . . 7E is thus adapted to be energised when the wiper 39a of the bank 39, or the wiper 40a of the bank 40, engages the corresponding contact in the bank, as will be described below.

The programme selector switch PS is also provided with a contact bank 41, the first twelve sequential contacts being severally connected to contacts on the bank 42 of a counting selector switch CS. Each contact on the bank 42 represents a different duration of an event, and hence the desired duration of any one event in the pragramme can be preset by connecting the appropriate contact on the bank 41 of the programme selector switch PS to the particular contact on the bank 42 of the counter switch CS which represents the desired duration.

Figure 6:
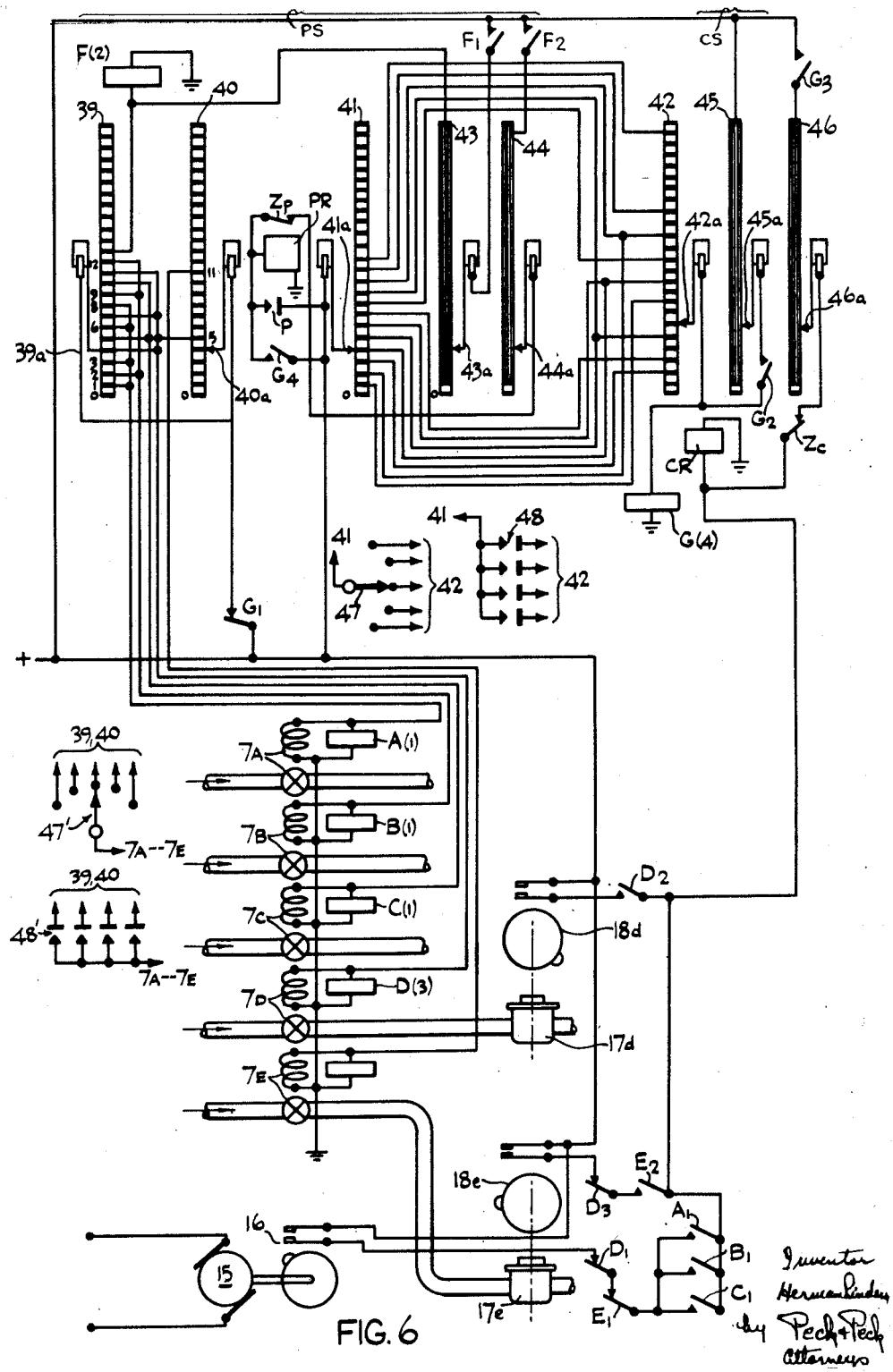

The arrangement illustrated in Fig. 6 relates to a programme of operation of a series of solenoid operated valves in diffrent fluid circuits, these valves constituting the respective devices 7A . . . 7E. The devices 7A, 7B, 7C control fluid circuits in which the fluid is required to be delivered on a time or clock basis. The devices 7D, 7E control fluid circuits in which the fluid is to be delivered by volume. The programme represented by the circuit can be tabulated as follows:

| Event | Valves | Number of Pulses | |
|---|---|---|---|
| | | Time Units | Volume Units |
| 1 | 7A | 8 | |
| 2 | 7B | 14 | |
| 3 | 7A | 2 | |
| 4 | 7D | | 10 |
| 5 | 7C and 7D | 10 | 5 |
| 6 | 7A | 10 | |
| 7 | 7D | | 3 |
| 8 | 7A | 12 | |
| 9 | 7B | 5 | |
| 10 | 7C | 14 | |
| 11 | 7D and 7E | | 16 |
| 12 | 7B | 23 | |

From the above table, it will be seen that the numbering of the events corresponds with the sequential numbering of the contacts on the banks 39, 40 and 41, whilst the numbers of pulses representing the units of time or volume correspond with the sequential numbers of the contacts on the bank 42 of the counter selector switch CS.

The thirteenth contact on the bank 39 of the programme selector switch PS is connected to the relay F(2), the other side of which is earthed. This thirteenth contact is also directly connected to a bank of contacts 43 on the programme selector switch PS, all the contacts of which except the zero contact are strapped together. The wiper 43a associated with the bank 43 is connected to the positive main through normally open contacts $F_1$ controlled by the relay $F(2)$. A further or "homing" bank of contacts 44 in the programme selector switch is arranged similarly to the bank 43, and is also connected to the positive main through normally open contacts $F_2$, also controlled by the relay $F(2)$. The wiper 44a of this bank is connected to the self-drive or zeroising contacts $Z_p$ of the operating coil PR of the programme selector switch PS.

The wiper 42a associated with the bank of contacts 42 of the counter selector switch CS is connected to a relay $G(4)$, the other side of which is connected to earth. The wiper 41a of the bank of contacts 41 in the programme selector switch is connected direct to the positive main. It will thus be seen that the relay $G(4)$ is energised when the wiper 42a of the counter selector switch finds a contact of the bank 42 which is energised from that contact of the bank 41 in the programme selector switch PS which is, for the time being, engaged by the wiper 41a.

The counter selector switch CS also has two contact banks 45, 46, the former of which is directly connected to the positive main whilst the latter or "homing" bank is connected thereto through the normally open contacts $G_3$ operated by the relay $G(4)$. All but the zero contacts on each of these two banks are strapped together. The wiper 45a is connected to the relay $G(4)$ through normally open hold-on contacts $G_2$, whilst the wiper 46a is connected to the self-drive contacts $Z_c$ associated with the operating coil CR of the counter selector switch CS.

The operation of the controller is as follows. All the wipers of both selector switches are initially at the zero position. The programme is initiated by means of a push button P, the closure of which energises the operating relay PR of the programme selector switch PS. The selector switch thus advances one step so that the wiper 39a makes contact with the first operative contact on the bank 39. (This contact is numbered 1 in the drawings.) The device 7A is thereupon energised to open the valve in the fluid circuit associated therewith. Simultaneously, the relay $A(1)$ is energised, and the contacts $A_1$ operated thereby are closed to connect the clock pulse generator 16 in circuit with the operating coil CR of the counter selector switch CS.

At the same time as the wiper 39a moves on to contact number 1 of the bank 39, the wiper 41a is advanced to engage the corresponding contact on the bank 41 of the programme selector switch PS, and this contact is directly connected to the eighth contact on the bank 42 of the counter selector switch CS. This latter contact is thus connected to the positive main. The counter selector switch CS is stepped round by the clock pulse generator 16 until the wiper 42a finds the live contact (No. 8) on the bank 42, whereupon the relay $G_4$ is energised.

Energisation of this relay open the normally closed contacts $G_1$ which are connected in series between the positive main and the wipers 39a, 40a of the programme selector switch. The device 7A is thereby de-energised to terminate the first event, and the relay $A(1)$ is simultaneously released to open the contacts $A_1$ and thus to stop the counter selector switch CS. At the same time, the hold-on contacts $G_2$ are closed so that the relay $G(4)$ remains energised through the wiper 45a and the bank of contacts 45 in the counter selector switch. The contacts $G_3$ are also closed to energise the "homing" bank 46 of the counter selector switch, and thence, through the wiper 46a and the self-drive contacts $Z_c$, to energise the operating coil CR of the counter selector switch CS.

The relay $G(4)$ also closes the normally open contacts $G_4$ to connect the positive main to the driving coil PR of the programme selector switch PS, the wipers of which are moved on one step. The construction of the switch, however, is such that the movement of the wipers does not take place until the operating coil PR is again de-energised.

The counter selector switch CS continues to "home" until the wipers 45a, 46a reach the zero contacts of their respective banks 45, 46 and thus de-energise the relay $G(4)$ and disconnect the supply to the self-drive contacts $Z_c$ of the operating coil CR. As soon as the relay $G(4)$ is released, the contacts $G_4$ are opened so that the operating coil PR is de-energised and the wipers of the programme selector switch PS are advanced one step. Simultaneously, the positive main is reconnected to the wipers 39a, 40a through the normally closed contacts $G_1$ so that the device which is connected to the second contacts on the banks 39, 40 is energised. In the arrangement shown this is the device 7B.

The series of operations is thus repeated, except that the fourteenth contact on the bank 42 of the counter selector switch is now energised in place of the eighth, and the valve controlled by the device 7B remains open until the wiper 42a has been stepped round as far as the fourteenth contact. Subsequent events in the programme are similarly carried out, as will be understood.

When the relay $G(4)$ has been energised to terminate the last event represented by the contact 12 on the bank 39 of the programme selector switch PS, the next step of this selector switch energises the thirteenth contact which is connected to the relay $F(2)$. This relay thus operates to close the contacts $F_1$, $F_2$. The wiper 43a now connects the positive main through the bank 43 to the relay $F_2$, and serves as a hold-on circuit for this relay until the programme selector switch PS has been automatically restored to zero. The "homing" bank 44 is connected through the wiper 44a to the self-drive contacts $Z_p$ whereby the operating coil PR is energised to return all the wipers of the programme selector switch PS to zero. As soon as this condition has been reached, the relay $F(2)$ is de-energised and the controller is automatically reset for a further programme sequence. The controller may be arranged to repeat the programme automatically if desired.

Although it has been indicated that the controller is designed for a fixed programme, it will be understood that some degree of flexibility can be introduced by the provision of additional switching arrangements between the programme selector bank 41 and the counter selector bank 42. Thus, for example, in certain circumstances it may be desirable to vary the duration of an event in the programme. This can be achieved by inserting a change-over switch 47 or a set of parallel connected interlocked push-buttons 48 in the corresponding connection between the banks 41 and 42 on the respective selectors PS, CS whereby alternative duration contacts on the counter selector bank 42 can be placed in circuit with the given event contact on the programme selector bank 41.

Similarly, an event-controlling device 7A ... 7E may be connected through a similar changeover switch 47', or set of interlocked push-buttons 48' to any one of a plurality of contacts in the bank 39 or 40 of the programme selector PS so that the position of the event in the sequence can be varied to suit special circumstances. Within the limits of permissible space and complexity of the controller in any particular instance, therefore, this form of programme controller is flexible, and has the advantage that changes of programme can be made instantaneously, and during operation of the apparatus, instead of requiring the stopping thereof for a sufficient time to enable a chart to be changed.

In a still further alternative arrangement, some or all of the connections to the contacts of the banks 39, 40, 41 and 42 may be made by means of flexible leads and wander plugs so that any programme within the capacity of the apparatus can be set up.

In the embodiment of the invention which is illustrated in Fig. 7, the apparatus is intended for use in supplying a predetermined quantity of, say, a fluid at each event, which quantity can be preset on the apparatus by an operator, the instant of commencement of the event being chosen at will. The apparatus comprises a pulse generator 50, which may be driven by a volumetric flow-meter (not shown), the output from the generator 50 being fed to the driving coils $CR_1$, $CR_2$, $CR_3$ respectively. Each selector has two banks of fixed contacts 51, 52; 53, 54; and 55, 56 respectively, and a moving contact $51a$ ... $56a$ associated with each in known manner.

A control valve in the fluid circuit (not shown) is operated by a servo-motor or solenoid M which is connected in circuit with the positive main through contacts $H_1$ of a relay H(5). Each contact in the banks 51, 53, and 55 on the respective selector switches $CS_2$, $CS_3$, $CS_4$ is connected to a corresponding contact on a respective single pole 10-way duration presetting collective switch 57, 58, 59. (Only the connections between the bank 51 of the selector $CS_1$ and the 10-way switch 57 are shown in the drawings to avoid undue complexity thereof.)

The tenth contact on each of the banks 51, 53 of the selectors $CS_1$, $CS_2$ is connected, through normally open relay contacts $J_2$, $J_3$ respectively, to the driving magnet $CR_2$ $CR_3$ of the next succeeding selector $CS_2$, $CS_3$, so that the latter is advanced one step on every tenth step of the preceding selector. The selector $CS_3$ thus counts hundreds, the selector $CS_2$ tens, and the selector $CS_1$ units, of pulses derived from the pulse generator 50, the units, tens, and hundreds of a number representing the desired duration of the event concerned being preset on the collective presetting switches 57, 58, 59 respectively. These latter are provided with "tailed" or short-circuiting moving contact arms $57a$, $58a$, $59a$ which are arranged to short-circuit all the contacts between zero and the value to which they are individually preset. The moving contact arms $57a$, $58a$, $59a$ are connected to the positive main through the normally closed contacts of a push button SP. The wipers $51a$, $53a$, $55a$ of the selectors $CS_1$, $CS_2$ $CS_3$ are commoned and connected through the normally open contacts of a push button P to the relay H(5).

All the contacts except the zero-position contacts in each of the banks 52, 54, 56 are strapped together and are energised from the positive main. The wiper $52a$ is connected to the driving magnet $CR_1$ of the selector $CS_1$ through normally closed relay contacts $H_2$ and self-drive contacts $Z_1$. Similarly, the wiper $54a$ is connected to the driving magnet $CR_2$ through normally closed relay contacts $H_3$ and self-drive contacts $Z_2$, and the wiper $56a$ to the driving magnet $CR_3$ through normally closed relay contacts $H_4$ and self-drive contacts $Z_3$.

In operation, the duration of the event controlled by the device M is first set up on the ten-way switches 57, 58, 59. Push button P is then pressed to complete the circuit from the positive main through the moving contact arms $57a$, $58a$, $59a$ of the 10-way switches 57, 58, 59 to the fixed contacts on the selector banks 51, 53, 55, and thence through the wipers $51a$, $53a$, $55a$ to earth through the relay H(5). This relay is thus energised, provided that at least one of the 10-way switches 57, 58, 59 is set to a number other than zero.

When the relay H(5) is operated, its contacts $H_1$, $H_2$, $H_3$, $H_4$, and $H_5$ perform the following functions:

$H_1$ connects the positive main to the device M, thus starting the pulse generator 50 through the connection 60 (which may be of a mechanical or electrical nature), and energising the relay $J_3$ intermittently;

$H_2$, $H_3$, $H_4$ disconnect the "homing" banks 52, 54, 56 on the selectors $CS_1$, $CS_2$, $CS_3$ from their respective driving magnets $CR_1$, $CR_2$, $CR_3$;

$H_5$ short-circuits the push button P, holding in the relay H(5) so that the push button can be released without stopping the controller.

The presetting collective switch 57 connects the positive main through the push button SP to those fixed contacts on the bank 51 of the selector $CS_1$ which are connected to the contacts engaged by the arm $57a$ of the presetting switch 57—in the example shown, the contacts 1, 2, 3, 4, and 5. Hence the wiper $51a$ will be connected to the positive main for its first four steps on the bank 51 (zero on the bank being connected to contact No. 1 on the presetting switch), and on the fifth step will be disconnected. Similar conditions obtain for the switch 58 and wiper $53a$, and for the switch 59 and the wiper $55a$, so that when the wipers $51a$, $53a$, $55a$ are all on fixed contacts on their respective banks which are not connected to the positive main through switches 57, 58, 59, the relay H(5) will be de-energised.

The pulse generator 50 connects the positive main intermittently to the relay J(3) so that it will be energised and de-energised at the generator frequency. The operating coil $CR_1$ is thus energised at the generator frequency through the contacts $J_1$ and one or more of the wipers $51a$, $53a$, $55a$. The wiper $51a$ of the units selector $CS_1$ will continue to be stepped round so long as the relay J(3) continues to be energised, which in turn depends on the continued energisation of the relay H(5) through one or more of the wipers $51a$, $53a$, $55a$. Each time the wiper $51a$ reaches the tenth contact on the bank 51, it connects the positive main to the relay contacts $J_2$, and thus the next pulse from the generator 50 will energise both the driving magnets $CR_1$ and $CR_2$, causing the selectors $CS_1$ and $CS_2$ to move on one step together. Similarly, each time the wiper $53a$ of the selector $CS_2$ reaches its tenth contact, it connects the positive main to the relay contacts $J_3$ and thus the next pulse will energise all three driving magnets $CR_1$, $CR_2$, $CR_3$ and move all the selectors on one step together. It will thus be seen that the selector CS2 is moved one step for every ten steps of the selector CS1, and the selector CS3 is moved one step for every hundred steps of the selector CS1.

When the total number of steps made by the selector CS1 is equal to the total set up on the presetting switches 57, 58, 59 (representing the desired duration of the event performed by the device M), each of the wipers will be on fixed contacts on the respective banks 51, 53, 55 which are not connected to the positive main, and thus the relay H(5) will be de-energised. The device M is thereby de-energised and the event is terminated. At the same time the self-drive contacts $Z_1$, $Z_2$, $Z_3$ are energised through the "homing" banks 52, 54, 56 (which are connected to the positive main), "homing" wipers $52a$, $54a$, $56a$ and relay contacts $H_2$, $H_3$, $H_4$ respectively, and all the selectors CS1, CS2, CS3 return immediately to zero position. The controller is then ready for the next event.

If it is desired to stop the event before the preset duration has elapsed, the push button SP is depressed so that the positive main is disconnected immediately from the banks 51, 53, 55 and the relay H(5) is de-energised to open the contacts $H_1$ and $H_5$ and to allow the contacts $H_2$, $H_3$, $H_4$, to reclose. The selectors CS1, CS2, CS3 then home to their zero positions.

By means of apparatus according to the invention, therefore, the duration of an event can be preselected on a duration presetting device the manufacturing tolerances of which do not determine the degree of accuracy to which the controller will operate, whilst the amount of wear during use does not proportionately affect this accuracy.

In a modified form of the controller described above with reference to Fig. 7, one or more push button or like preselector devices may each be arranged, in known manner, to short-circuit groups of contacts on the banks 51, 53, 55 and connect them to the positive main so as to preselect specific durations—as, for example, where the device M is to be used to control the flow of a fluid in a particular apparatus in which the quantity of fluid required to be delivered at each event has a limited and known number of values. Such push buttons may be fitted as the sole duration presetting devices, or as well as the variable multicontact collective switches 57, 58, 59 as desired. The controller may also be adapted to operate on a time basis instead of on a basis of units of flow by providing a clock drive for the generator 50. Both forms of drive may be incorporated in the one controller, provision being made for the alternative selection of the appropriate drive before the commencement of an event.

In constructions of controller in which a chart of the kind shown in Figs. 1, 2, and 5, and the apertures are explored by means of photoelectric cells, one cell is provided in each position occupied by a contact finger 10, the contact surfaces 2, 3, and 4 being replaced by a sheet or sheets of transparent material whereby the apertures 34, 35 may be illuminated. The photocells may control respective electronic relay circuits for performing the necessary operations when the cells are illuminated.

What I claim is:

1. Automatic event control apparatus comprising an impulse generator for generating impulses representing duration of an event, a step-by-step selector switch adapted to be energised by said generator, a chart having groups of markings, one group representing events and another group representing durations of an event, exploring means co-operating with the events group of markings to initiate an event and to connect said generator to the selector switch driving mechanism, further exploring means to cooperate with the duration group of markings, an operative connection between the said further exploring means and a selected contact of the selector switch representing the desired duration of the selected event, and means included in the said operative connection for terminating the selected event and for initiating another event.

2. Automatic control apparatus as claimed in claim 1 in combination with means for advancing the chart from a position in which one event performing device is rendered operative to the next position in which another event performing device is rendered operative.

3. In combination with automatic control apparatus as claimed in claim 2, means for resetting the selector switch to zero on the termination of each event.

4. Automatic control apparatus comprising a number of devices for performing different events, a first multi-contact selector switch having a series of fixed contacts connected to the event performing devices for energising the latter in accordance with a predetermined programme, a second series of fixed contacts, a second multicontact step-by-step selector switch having a bank of contacts each representing a different duration, an operative connection between each contact of the said second series and the appropriate contacts of the bank in the second multicontact selector switch, means for terminating the event represented by a given contact of the first series of the first selector switch when the appropriate contact of the bank in the second selector switch is found, means for returning the moving contact of the second selector switch to zero on termination of the said event, and means for simultaneously advancing the first selector switch to energise the next event performing device in the programme.

5. Apparatus for controlling a sequence of events, each having an appropriate duration, comprising means for generating impulses to measure the said durations in any desired scale of units, a first step-by-step mechanism for effecting the desired successive operation of the events in the sequence, a second and independent step-by-step mechanism for counting the impulses representing the appropriate duration of each event, means for presetting the counter mechanism to count the required number of impulses defining the said appropriate duration of each event in turn, means operated by the counter mechanism at the end of each event for advancing the first step-by-step mechanism through one step and for simultaneously restoring the said counter mechanism to its zero position, and means controlled by the first step-by-step mechanism for restarting the counter to determine the duration of the next event in the sequence.

6. Apparatus for controlling a sequence of events comprising an impulse generator for generating numbers of impulses to represent, in any desired scale of units, duration of an event in the sequence, means for counting the said pulses, means for preselecting the order of operation of the several events in the said sequence, means for preselecting the required duration of each event including means for presetting, with reference to a common zero, the number of impulses appropriate to the duration of each successive event in the sequence, a step-by-step mechanism for advancing the said preselecting means, at the termination of an event, to its next operative condition, a relay device connected to the counter through the duration presetting means for energising said mechanism when the appropriate number of impulses has been counted, and elements controlled by said relay device for simultaneously initiating the operation of the counter and of an event in dependence on the setting of the event preselecting means.

7. Apparatus for controlling a sequence of events, each having an appropriate duration, comprising means for generating impulses to measure the said durations in any desired scale of units, an event selector device having a separate preset condition for each event in the sequence, means associated with the event selector device for preselecting the number of pulses representing the appropriate duration of the corresponding event, a stepwise drive mechanism for advancing the event and duration selector devices to their next operative positions at the end of a preceding event, a counter for counting the preselected number of impulses at each successive condition of the event selector device, an event terminating device connected in series with the said selector devices and the counter, and a relay energised by the event terminating device for operating the stepwise drive mechanism and for returning the counter to zero.

8. Apparatus as claimed in claim 7 wherein the impulse generating means comprises a first generator embodying a clock mechanism for generating impulses at regular intervals of time and a second generator embodying a member responsive to the flow of a commodity for generating impulses representing units of flow, and relay means associated with the event selected at any given time and energised by the event selector device connecting to the counter that generator which is appropriate to the selected event.

9. Automatic control apparatus as claimed in claim 6 wherein the means for preselecting the duration of an event comprises a number of multicontact step-by-step selector switches each having a bank of contacts representing different durations of the event, means for energising at will any number of contacts of a bank in each selector switch in accordance with a desired duration for the event, a series connection between the highest contact of a bank and the driving mechanism of the next subsequent selector switch, means for energising the event performing device and for simultaneously connecting the impulse generator to the driving mechanism of the first selector switch, means for de-energising the event performing device when the last selector switch in the sequence moves away from an energised contact, and means for restoring the circuit to its initial state.

HERMAN LINDARS.

References Cited in the file of this patent

UNITED STATES PATENTS

| Number | Name | Date |
|---|---|---|
| 2,049,634 | Troutman | Aug. 4, 1936 |
| 2,346,869 | Poole | Apr. 18, 1944 |
| 2,348,141 | Luhn | May 2, 1944 |
| 2,375,413 | Guenther | May 8, 1945 |
| 2,381,920 | Miller | Aug. 14, 1945 |
| 2,422,698 | Miller | June 24, 1947 |
| 2,461,266 | Gray | Feb. 8, 1949 |
| 2,570,306 | Battersby | Oct. 9, 1951 |